(12) United States Patent
Breault

(10) Patent No.: US 7,556,874 B2
(45) Date of Patent: Jul. 7, 2009

(54) FUEL CELL TEMPERATURE CONTROL BY EVAPORATIVE COOLING

(75) Inventor: Richard D. Breault, North Kingstown, RI (US)

(73) Assignee: UTC Power Corporation, South Windsor, CT (US)

( * ) Notice: Subject to any disclaimer, the term of this patent is extended or adjusted under 35 U.S.C. 154(b) by 990 days.

(21) Appl. No.: 10/649,244

(22) Filed: Aug. 27, 2003

(65) Prior Publication Data
US 2005/0048354 A1 Mar. 3, 2005

(51) Int. Cl.
*H01M 8/04* (2006.01)
*H01M 8/06* (2006.01)

(52) U.S. Cl. .............................. 429/26; 429/24; 429/25; 429/13; 429/38

(58) Field of Classification Search ............. 429/24–26, 429/13, 30, 38
See application file for complete search history.

(56) References Cited

U.S. PATENT DOCUMENTS

| | | | |
|---|---|---|---|
| 3,704,172 A | 11/1972 | Stedman | 136/86 R |
| 4,769,297 A | 9/1988 | Reiser et al. | 429/17 |
| 4,824,741 A | 4/1989 | Kunz | 429/26 |
| 4,826,741 A | 5/1989 | Aldhart et al. | 429/30 |
| 4,994,331 A | 2/1991 | Cohen | 429/17 |
| 5,853,909 A | 12/1998 | Reiser | 429/13 |

*Primary Examiner*—Tracy Dove
(74) *Attorney, Agent, or Firm*—Andrew D. Gathy

(57) ABSTRACT

To evaporatively cool fuel cells, the pressure in steam carrying channels on one side of a hydrophobic porous liquid/vapor barrier layer disposed between adjacent fuel cells is reduced to below the vapor pressure of liquid water passing through liquid water carrying channels on the other side of the barrier layer, such as by using a vacuum pump. This causes some of the liquid water to boil and change to steam. The steam passes through the barrier layer into the steam channels and is carried out of the cells. The operating temperature of the fuel cell is adjusted by controlling the pressure within the steam channels, such as by controlling the amount of heat removed from the steam after it leaves the steam channels.

9 Claims, 1 Drawing Sheet

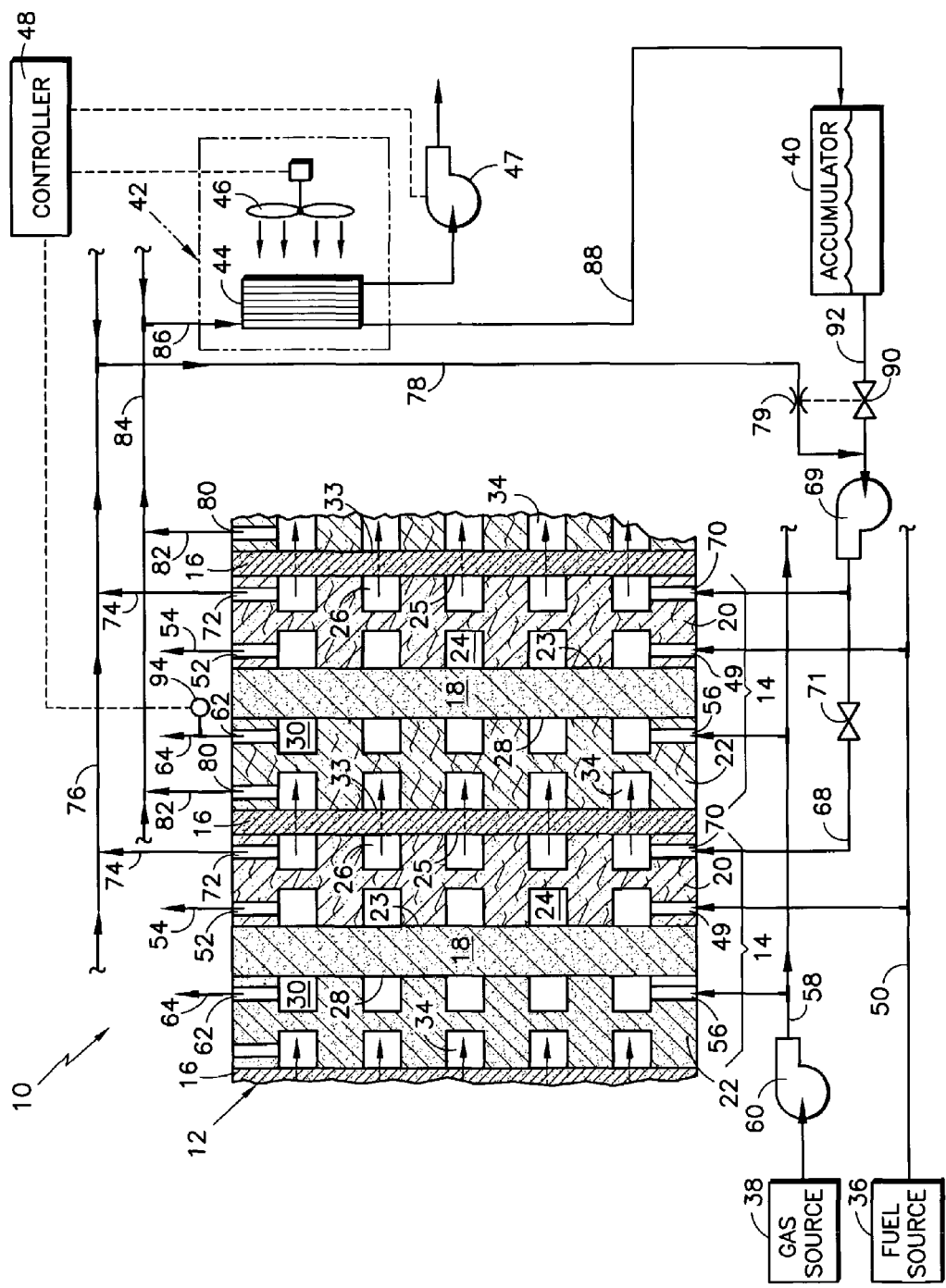

FUEL CELL TEMPERATURE CONTROL BY EVAPORATIVE COOLING

BACKGROUND OF THE INVENTION

1. Technical Field

The present invention relates to fuel cells and, in particular, the cooling of fuel cells.

2. Background Information

Evaporative cooling of fuel cells is well known in the art. Commonly owned U.S. Pat. No. 3,704,172 to Stedman et al describes the use of evaporative cooling in a fuel cell system. In that system, a porous liquid/vapor barrier is disposed between adjacent fuel cells. Liquid water is directed across one side of the barrier and is partially converted to steam by having a pressure on the other side that is lower than the vapor pressure on the liquid side. As stated in Stedman et al, the vapor pressure at the exit of the vapor side of a liquid/vapor porous barrier is a function of the operating temperature of the fuel cell within which the barrier is located. In Stedman et al the vapor pressure at the exit of the vapor side of the barrier is monitored, and the amount of liquid coolant flow into the cell on the liquid side of the liquid/vapor barrier is controlled as a function of that vapor pressure in order to maintain a predetermined pressure differential between the vapor outlet and the liquid water inlet, thereby maintaining a desired cell temperature.

BRIEF SUMMARY OF THE INVENTION

One object of the present invention is a method for cooling a fuel cell wherein the amount of water required for cooling is relatively small.

Another object of the present invention is a method for controlling the temperature of a fuel cell using evaporative cooling.

An object of one embodiment of the present invention is a method for controlling the temperature of a fuel cell by adjusting the pressure on the vapor side of an evaporative cooler within the fuel cell.

According to the present invention, to evaporatively cool fuel cells, the pressure in first channels (steam channels) on one side of a hydrophobic porous barrier layer disposed between adjacent fuel cells is reduced to below the vapor pressure of liquid water passing through second channels (liquid channels) on the other side of the porous barrier layer to cause some of the liquid water in the second channels to boil and change to steam. The steam passes through the barrier layer into the steam channels and is carried out of the cells. The fuel cell temperature is controlled by controlling the pressure within the steam channels (the steam pressure).

In one embodiment, the steam pressure within the steam channels is reduced to below the vapor pressure of the liquid water in the liquid channels on the other side of the barrier layer using a vacuum pump. Adjustments to the steam pressure, and thus the cell temperature, may be made by controlling the operation of the vacuum pump based upon a monitored fuel cell reactant gas stream (fuel or oxidant) temperature.

The lower the pressure in the steam channels, the lower the boiling point of the water on the other side of the barrier layer. Since the liquid water cannot be allowed to pass into the barrier layer, the pressure differential between the fluids in the liquid water channels and the steam pressure within the steam channels cannot be allowed to exceed the water intrusion pressure of the porous barrier layer. Water intrusion pressure is defined as the water pressure required to force water into a gas or vapor filled hydrophobic structure.

In a preferred embodiment the barrier layer is disposed between a pair of porous, hydrophilic water transport plates (WTP's). One WTP has reactant gas channels in one side adjacent a fuel cell electrolyte layer and steam channels in its opposite side adjacent the barrier layer. The other WTP, on the other side of the barrier layer, has reactant gas channels adjacent the fuel cell electrolyte layer of an adjacent cell and liquid water channels in its opposite side adjacent the barrier layer. The bubble pressure of the WTP's must be high enough to prevent reactant gases from traveling through the plates and into the low pressure steam and water channels.

In another embodiment, instead of water transport plates on both sides of the barrier layer, one or both of the plates may be a nonporous separator plate having the steam or liquid water channels, as the case may be, formed therein.

The foregoing features and advantages of the present invention will become more apparent in light of the following detailed description of exemplary embodiments thereof as illustrated in the accompanying drawings.

BRIEF DESCRIPTION OF THE DRAWINGS

The sole FIGURE is a schematic representation of a fuel cell system.

DETAILED DESCRIPTION OF THE INVENTION

Referring to the FIGURE, a fuel cell system 10 includes a stack 12 of adjacent fuel cells 14 shown in cross-section. Adjacent cells are separated by a porous barrier layer 16. Each cell 14 includes an electrolyte layer 18 sandwiched between an anode plate 20 and a cathode plate 22. The anode plate 20 is a porous, hydrophilic anode water transport plate 20 (AWTP) and the cathode plate 22 is a porous hydrophilic cathode water transport plate 22 (CWTP).

In this exemplary embodiment the electrolyte layer 18 is a PEM (proton exchange membrane), but it could also be a layer that holds a liquid electrolyte such as phosphoric acid or potassium hydroxide. PEM's and liquid electrolytes are well known in the art. An example of a PEM fuel cell is described in commonly owned U.S. Pat. No. 6,024,848 to Dufner et al, and is incorporated herein by reference. Although not shown, between the PEM and the anode plate and between the PEM and the cathode plate, there are catalyst layers; and there may also be layers which function as catalyst substrates and as gas diffusion layers, all of which are well known in the art. It is intended herein that the term "electrolyte layer" include within its meaning any of these other layers.

Each AWTP defines, with the surface 23 of the electrolyte layer 18, fuel channels 24 for carrying a reactant fuel gas, such as hydrogen, across the fuel cell in contact with the anode catalyst. The AWTP also defines, with the surface 25 on the anode side of the barrier layer 16, channels 26 for carrying liquid water across the fuel cell in contact with the barrier layer and with the AWTP.

Each CWTP defines, with the surface 28 of the electrolyte layer 18, oxidant channels 30 for carrying an oxidant gas, such as air, across the fuel cell in contact with the cathode catalyst. The CWTP also defines, with the surface 33 on the cathode side of the barrier layer 16, channels 34 for carrying steam across the fuel cell, as will be further explained hereinafter.

The fuel cell system 10 further includes a hydrogen or other fuel gas source 36, an air or other oxidant gas source 38, a water accumulator 40, a radiator 42 (comprising a condenser 44 and a fan 46), a vacuum pump 47, and a controller 48.

In operation, the fuel gas from the source 36 is provided to the inlets 49 of the fuel channels 24 via a conduit 50. The fuel travels through the cells and leaves from outlets 52 via conduits 54. Although not shown, some or all of the fuel exhaust may be recirculated through the cells. Oxidant from the source 38 is provided to inlets 56 of the oxidant channels 30 via a conduit 58. A blower 60 in the conduit 58 provides the motive force. The oxidant travels through the cells and leaves from outlets 62 via conduits 64.

A water pump 69 moves liquid water through a conduit 68 into the water channels 26 via inlets 70. A pressure control valve 71 between the pump 69 and the water inlets 70 controls the water pressure entering the cell. Although not shown, signals indicative of the pressure differential between the fuel channels 24 and water channels 26 would be used to control the valve 71 to maintain the pressure in the water channels 26 slightly below (typically 1.0 to 3.0 psi below) the pressure in the fuel channels 24. The liquid water in the channels 26 travels through the cell in contact with the anode side surface 25 of the barrier layer and leaves the cells via outlets 72 into water outlet conduits 74. The conduits 74 feed the liquid water into a manifold or common conduit 76 and from there the water is recirculated through the cells via a return conduit 78 and the pump 69.

During operation of the fuel cells, the water in the channels 26 boils during cell operation and produces steam that passes through the barrier layers 16 into the steam channels 34. The steam leaves the cells through steam channel outlets 80 into conduits 82, which feed into a manifold or common conduit 84 and from there into the radiator 42 via a conduit 86. Within the radiator 42 the steam passes through the condenser 44, which converts the steam back to liquid water. The fan 46 is used to control the rate of heat removal. Condensate is fed from the radiator 42 to the accumulator 40 via a conduit 88. Non-condensable gases are removed from the system by the vacuum pump 47.

During operation an excess of water beyond that which is required to satisfy the evaporative cooling requirements of the cells, is circulated through the cells. A flow sensor 79 determines the amount of water flowing through the conduit 78. If the amount of water is insufficient, a valve 90 in a conduit 92 connected to the accumulator 40 and responsive to the sensor 79 allows additional water from the accumulator 40 into the return conduit 78 upstream of the pump 69. The pump 69 may be set at a constant flow rate; or the flow rate may be proportional to the current generated (i.e. the heat generated) by the cell. Alternatively, the pump may be controlled by the temperature or pressure of the steam at or exiting cell steam outlets 80.

The products of fuel cell operation are water, electricity, and heat. As is well known, the water content within the cells must be kept in balance to prevent dry out, on the one hand, and flooding, on the other. Most of the water generated by the cells leaves the cells in the exhaust gases. The rest of the water generated by the cells moves into the AWTP's (i.e. the plates 20 in the FIGURE) and the CWTP's (i.e. the plates 22 in the FIGURE). If operating conditions result in too much water leaving the cells, the water transport plates act as reservoirs to prevent immediate dry out of the electrolyte layers. If the water loss persists, water may be replenished from the excess water flowing through the channels 26, some of which would be absorbed into the AWTP, which is hydrophilic.

For some applications, such as automotive applications, it is desirable to minimize the amount of water required within the overall fuel cell to facilitate start-up from freezing conditions. For a cell operating at given reactant pressures and oxidant utilization, there is a corresponding cell reactant gas exit temperature that will keep the cell in water balance. Therefore, one way to maintain water balance is to maintain that corresponding cell reactant gas exit temperature, assuming the reactant pressures and oxidant utilization do not change. (Oxidant utilization is the rate of oxidant consumption by the cells divided by the rate of oxidant flow through the cells, generally expressed as a percentage.)

In the present invention the cells are cooled mostly by evaporative cooling. Evaporative cooling is accomplished by lowering the pressure in the channels 34 to below the vapor pressure of the water in the channels 26, such as with the vacuum pump 47. This causes the water in the channels 26 to boil and generates steam that passes through the porous barrier layer 16 into the channels 34. The lower the pressure in the channels 34, the lower the boiling point and the lower the operating temperature of the cells. In this preferred embodiment the amount of cooling and thus the operating temperature of the cells, is controlled by controlling the steam pressure in the channels 34.

The fuel cells are typically designed to operate optimally at a particular temperature or within a selected temperature range. PEM cells operating at or near atmospheric reactant pressures are typically operated within a range of 150° F. and 180° F. The vacuum pump 47 is sized to reduce the pressure in the steam channels 34 to a pressure that maintains the cell at an operating temperature selected to maintain the cell in water balance at a preselected air utilization and fuel gas utilization. In the exemplary embodiment of the present invention depicted by the FIGURE, the basic pressure within the steam channels is set by the size of the vacuum pump 47; and the final steam pressure in the channels 34, and thus the cell operating temperature, is controlled by the rate of heat removal in the radiator 42, which is controlled by the speed of the fan 46. Heat removal is a result of condensation of the steam and rejection of heat to atmosphere.

A temperature sensor 94 continuously monitors and measures the temperature of the oxidant exhaust stream (typically air) in the conduit 64 as it leaves the outlets 62. The air exhaust temperature is a known function of the actual cell operating temperature. A temperature sensor 94 communicates with the controller 48, which, in turn, communicates with and controls the speed of the fan 46. The fan speed is decreased to reduce the heat removal rate in the radiator, thereby increasing the steam pressure and increasing the boiling temperature of the water in the channels 26. This adjusts the cell operating temperature upward. The reverse is true when the fan speed is increased. Larger required adjustments of the pressure within the channels 34 may be made by changing the speed of the vacuum pump.

During fuel cell operation the barrier layer 16 must allow steam therethrough under the lowest expected pressure differential. The barrier layer must also have a sufficiently high water intrusion pressure and be hydrophobic to prevent liquid water from entering the barrier layer pores and from leaking through the barrier layer into the steam channels 34 under at least the highest expected operating pressure drop across the barrier. Additionally, the barrier layer must be electrically conductive and be able to otherwise survive the environment of the fuel cell stack in which it is used.

Similarly, the anode and cathode WTP's provide a barrier between the low pressure steam channels 34 and, respectively, the fuel channels 24 and oxidant channels 30. The WTP's must each have sufficiently high bubble pressures to withstand the pressure differentials between the steam channels 34 and, respectively, the fuel and oxidant channels.

A porous barrier layer may be made, for example, from porous carbon or porous graphite and be coated with a suitable wetproofing material such as tetrafluoropolyethylene or other fluoropolymer. With a maximum pore size of one micron and a contact angle of 120°, the barrier will have a water intrusion pressure of 100 kPa (14.7 psia).

As an example, in a fuel cell using such a barrier layer and having a PEM electrolyte, assume pure hydrogen is the fuel and is supplied to the cells at 130 kPa (about 19.1 psia) and air is the oxidant and is supplied at 100 kPa. Also assume the water in the channels 26 is at 100 kPa, the hydrogen utilization is 100%, and the air utilization is 80%. This combination of reactant pressure and utilization requires an air exit temperature (measured by the sensor 94 in the FIGURE) of 85° C. to maintain water balance, which, in turn, requires an absolute pressure in the steam channels of about 57 kPa (8.4 psia). This results in a differential of 43 kPa (6.3 psia) between the water pressure in the channels 26 and the fluid pressure in the steam channels 34. That pressure differential is well within the 100 kPa water intrusion range of the barrier layer described above.

In the foregoing example the cells also have a fuel (in channels 24) to water (in channels 26) overpressure of 30 kPa (4.4 psia) and an air (in the channels 30) to steam (in the channels 34) overpressure of 43 kPa (6.3 psia), both of which are well within the bubble pressure range of known WTP's made, for example, from porous graphite with a nominal mean pore size of less than 3.0 microns and nominal porosity of less than 35%. Such WTP's have bubble pressures of 105 kPa and higher.

Although, in the embodiment shown in the FIGURE and described above, the air exhaust temperature is used as the basis for determining the cell operating temperature, any stream whose temperature is a known function of the cell operating temperature may be used in its place. Alternatively, any parameter or combination of parameters that are a known function of the cell operating temperature, such as the pressure and temperature of the steam exiting the steam outlet 80, may be used by the controller 48 for controlling operation of the radiator or for otherwise making adjustments to the steam pressure and, ultimately, the operating temperature of the cell.

Although, in the FIGURE and the foregoing description of exemplary embodiments of the invention, the liquid water channels 26 are on the anode side of the cell in the AWTP and the steam channels 34 are on the cathode side of the cell in the CWTP, they could be reversed. In that case, the liquid water would be passed through channels formed on the cathode side of the barrier layer and the steam would pass through the barrier layer into steam channels on the anode side of the barrier layer. All other aspects of the invention remain the same. Having the steam and water channels located as shown in the FIGURE is preferred because water may be required to humidify the fuel if the dew point of the incoming fuel stream is low.

Although the plates 20 and 22 of the exemplary embodiment are porous and hydrophilic, one or both of them may be nonporous, solid plates known in the art as separator plates.

It should be understood by those skilled in the art that the foregoing and various other changes, omissions and additions may be made without departing from the spirit and scope of the invention.

What is claimed is:

1. In a stack of fuel cells, wherein adjacent cells are separated by a porous, hydrophobic barrier layer having a water intrusion pressure that prevents liquid water from crossing between cells through the barrier layer under normal operating conditions, the cell on one side of the barrier layer defining a flow channel for liquid water adjacent that one side of the barrier layer, the cell on the other side of the barrier layer defining a flow channel for steam adjacent that other side of the barrier layer, said water and steam flow channels being in vapor communication with each other through the barrier layer, the process of cooling the fuel cells by evaporative cooling during fuel cell operation comprising the steps of:

flowing liquid water into and through the water flow channel and out of the fuel cell, the water being heated within the water channel by heat produced by the fuel cell; and causing the liquid water to boil as it flows through the water channel by reducing the pressure in the steam channel below the vapor pressure of the flowing liquid water to convert at least some of the water to steam that passes through the barrier layer into the steam channel, wherein the pressure in the steam channel is increased or decreased during cell operation in response to the operating temperature of the cell to increase or decrease the operating temperature of the cell to achieve a desired cell operating temperature; wherein the step of reducing the pressure in the steam channel includes drawing a vacuum in the steam channel, and the step of increasing or decreasing the pressure in the steam channel includes passing the steam through a radiator after the steam leaves the cell and controlling the amount of heat removed from the steam within the radiator; and condensing the steam outside the fuel cell and recirculating a portion of the condensed steam back to the flowing liquid water, wherein the steam originated as the flowing liquid water converted into steam and passed through the barrier layer into the steam channel.

2. The cooling process according to claim 1, wherein steam is condensed to water within the radiator and at least a portion of the condensate is made available for recirculation through said water channels.

3. The cooling process according to claim 1, wherein each fuel cell includes a PEM and operates on reactant gasses that are at substantially atmospheric pressure, and the pressure in the steam channels is controlled to maintain the cell operating temperature between 150° F. and 180° F.

4. A method for evaporatively cooling a plurality of adjacent fuel cells, wherein each cell comprises an electrolyte layer sandwiched between a porous anode water transport plate and a porous cathode water transport plate, the anode plate of one cell extending from the electrolyte layer of the cell to one side of a porous hydrophobic, electrically conductive barrier layer separating the two adjacent cells, and the cathode plate of the adjacent cell extending from the electrolyte layer of said adjacent cell to the other side of said barrier layer, the steps of:

a) flowing liquid water adjacent one side of the barrier layer through first channels formed between one of the cell water transport plates and the barrier layer;

b) drawing a vacuum in second channels formed between the transport plate of the adjacent cell and the other side of the barrier layer to reduce the pressure in the second channels to below the vapor pressure of the water in the first channels to cause the liquid water to boil and produce steam that passes through the barrier layer into the second channels;

c) removing the steam from the second channels; and, d) controlling the amount of evaporative cooling by controlling the steam pressure in the second channels.

5. The method according to claim 4, wherein the electrolyte layer is a PEM.

6. The method according to claim 4, wherein the step (d) of controlling the amount of evaporative cooling includes passing the steam from the second channels through a radiator that includes a fan, and controlling the speed of the fan to control the steam pressure in the second channels.

7. The method according to claim 4, wherein in step (d) the operating temperature of the cell is continuously determined and the amount of evaporative cooling is regulated by adjusting the steam pressure within the steam channels in response to the operating temperature to maintain or change the operating temperature as desired.

8. The method according to claim 7, wherein the electrolyte layer is a PEM.

9. The method according to claim 6, wherein the step of passing the steam through a radiator includes condensing steam to liquid water, wherein some of that condensed liquid water is directed into a water accumulator and recirculated through the first channels as needed.

* * * * *